(12) United States Patent
Munch et al.

(10) Patent No.: US 6,292,096 B1
(45) Date of Patent: Sep. 18, 2001

(54) APPARATUS AND METHOD FOR TRANSMITTING DATA IN A TIRE CONDITION SENSING SYSTEM

(75) Inventors: Carl A. Munch, Troy; Daniel J. Wyman, Canton; Timothy DeZorzi, South Lyon, all of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/464,208

(22) Filed: Dec. 15, 1999

(51) Int. Cl.$^7$ .................................................. B60C 23/00
(52) U.S. Cl. ........................ 340/445; 340/446; 340/442; 340/447; 73/146.2; 73/146.8; 116/34 R
(58) Field of Search .................................... 340/442, 447, 340/443, 444, 445, 438, 446; 73/146.2, 146, 146.8; 116/34 R (56) References Cited

U.S. PATENT DOCUMENTS

| | | | |
|---|---|---|---|
| 4,117,452 | * | 9/1978 | Snyder et al. ........................ 340/58 |
| 4,316,176 | | 2/1982 | Gee et al. . |
| 4,510,484 | * | 4/1985 | Snyder .................................. 340/58 |
| 5,285,189 | * | 2/1994 | Nowicki et al. ..................... 340/447 |
| 5,463,374 | | 10/1995 | Mendez et al. . |
| 5,505,080 | * | 4/1996 | McGhee ............................... 340/447 |
| 5,540,092 | | 7/1996 | Handfield et al. . |
| 5,573,610 | | 11/1996 | Koch et al. . |
| 5,600,301 | * | 2/1997 | Robinson, III ....................... 340/442 |
| 5,602,524 | | 2/1997 | Mock et al. . |
| 5,612,671 | | 3/1997 | Mendez et al. . |
| 5,656,993 | | 8/1997 | Coulthard . |
| 5,741,966 | | 4/1998 | Handfield et al. . |
| 5,783,992 | | 7/1998 | Eberwine et al. . |

* cited by examiner

*Primary Examiner*—Jeffery Hofsass
*Assistant Examiner*—Daniel Previl
(74) *Attorney, Agent, or Firm*—Tarolli, Sundheim, Covel, Tummino & Szabo L.L.P (57) ABSTRACT

A tire condition sensing apparatus (14) includes a tire condition sensor (78, 84, 88) for sensing a tire condition and providing a sensor signal indicative thereof. A transmitter (44) transmits a data message having a plurality of data locations for accommodating data. A controller (72) is electrically connected with the tire condition sensor (78, 84, 88) and the transmitter (44). The controller (72) controls the transmitter (44) to transmit tire condition data in selected data locations of the data message based on a parameter associated with the apparatus (14), such as an identification code of the apparatus (14).

30 Claims, 3 Drawing Sheets

APPARATUS AND METHOD FOR TRANSMITTING DATA IN A TIRE CONDITION SENSING SYSTEM

TECHNICAL FIELD

The present invention relates to a tire condition sensing apparatus and, more particularly, to an apparatus and method for transmitting data in a tire condition sensing system.

BACKGROUND OF THE INVENTION

Numerous tire pressure monitoring systems have been developed in order to detect when the air pressure within a tire drops below a threshold pressure value. A system typically includes a pressure switch, an internal power source, and a communications link that provides the tire pressure information from a location at each vehicle tire to a central receiver, which may be mounted on the vehicle dashboard. The communications link may be a wired or wireless link.

There has been an increasing need for tire pressure monitoring systems due to the use of "run flat" tires in vehicles. The "run flat" tires enable a driver to travel an extended distance after the loss of air pressure within a vehicle tire.

As more vehicles are equipped with tire pressure sensing systems, steps must be taken to reduce the likelihood of overlapping signals from tire pressure sensing modules. Examples of tire pressure monitoring systems are disclosed in U.S. Pat. No. 4,316,176, U.S. Pat. No. 5,573,610, U.S. Pat. No. 5,600,301, U.S. Pat. No. 5,602,524, U.S. Pat. No. 5,612,671 and U.S. Pat. No. 5,656,993.

SUMMARY OF THE INVENTION

One aspect of the present invention provides a tire condition sensing apparatus that includes a tire condition sensor for sensing a tire condition. A transmitter transmits a data message having a plurality of data locations for accommodating data. A controller is electrically connected with the tire condition sensor and the transmitter. The controller controls the transmitter to transmit data in selected data locations of the data message based on an identification code of the apparatus.

Another aspect of the present invention provides a tire condition sensing system that includes a plurality of tire condition transmitter modules. Each of the modules has a unique identification code and includes a tire condition sensor for sensing a condition of an associated vehicle tire. Each module also includes a transmitter which, when activated, transmits a data message having a plurality of data locations for accommodating data. Each module also includes a controller electrically connected with the tire condition sensor and the transmitter of the corresponding module. The controller controls the associated transmitter to transmit tire condition data in data locations of the data message selected based on the unique identification code of the corresponding module.

Still another aspect of the present invention provides a tire condition sensing apparatus that includes a tire condition sensor for sensing a tire condition. A transmitter transmits a data message having a plurality of data locations for accommodating data. A controller is electrically connected with the tire condition sensor and the transmitter. The controller controls the transmitter to transmit tire condition data in selected data locations of the data message based on a parameter associated with the apparatus.

Yet another aspect of the present invention provides a method of transmitting a data message from a tire condition module having an identification code. The method includes the steps of sensing a condition of a tire and determining random data locations of a data message based on the identification code of the tire condition module. A data message is transmitted, in which tire condition data indicative of the sensed tire condition is provided in the determined random data location of the data message.

BRIEF DESCRIPTION OF THE DRAWINGS

The foregoing and other features and advantages of the invention will become more apparent to one skilled in the art upon consideration of the following description and the accompanying drawings in which.

DESCRIPTION OF AN EXEMPLARY EMBODIMENT

Figure 1:
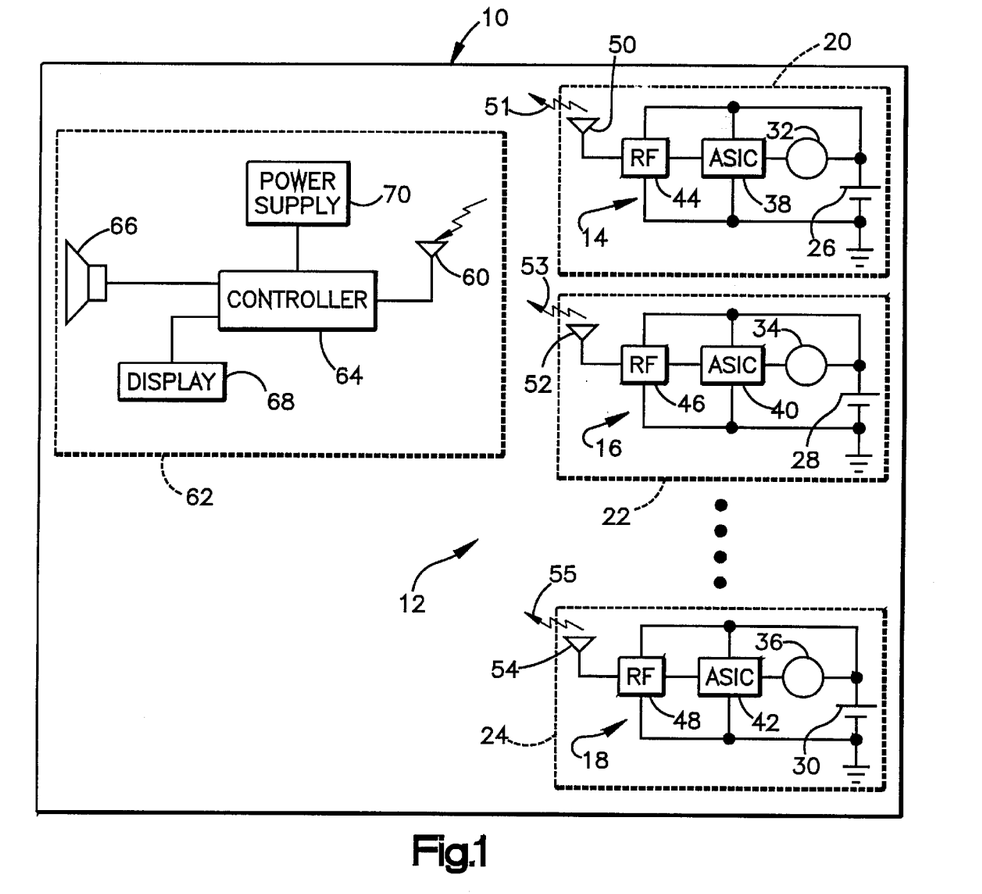
FIG. 1 is a schematic block diagram of a tire condition monitoring system in accordance with the present invention.

FIG. 1 schematically illustrates a vehicle 10 equipped with a tire condition monitoring system 12 in accordance with the present invention. The system 12 includes a plurality of tire condition sensor modules 14, 16, and 18 for sensing one or more tire conditions of associated vehicle tires 20, 22, and 24, respectively. While for purposes of brevity three modules 14, 16, and 18 are illustrated, there typically is one module associated with each vehicle tire, including any spare tire(s) of the vehicle 10.

Each module 14, 16, 18 includes a respective internal power supply 26, 28, 30 that supplies electrical energy to various circuit components of each associated module. In particular, each power supply 26, 28, 30 is electrically connected to a motion detector 32, 34, 36, respectively. Each power supply 26, 28, 30 also is electrically connected with a controller, such as an application specific integrated circuit (ASIC) 38, 40, 42, and to an RF transmitter 44, 46, 48, respectively. Each motion detector 32, 34, 36 provides a motion signal to the associated ASIC 38, 40, 42 having an electrical characteristic or state that indicates movement of the associated vehicle tire 20, 22, 24. Each ASIC 38, 40, 42 has a plurality of operating modes responsive to the motion signal from its associated motion detector 32, 34, 36. Each ASIC 38, 40, 42, in turn, controls the operation of each module 14, 16, 18 according to the its current operating mode.

As described in greater detail below, each ASIC 38, 40, 42 includes one or more sensors operative to sense one or more conditions of each associated vehicle tire 20, 22, 24 and/or operating parameters of the associated module itself. The sensors provide sensor signals indicative of the condition sensed thereby. The associated ASIC 38, 40, 42 processes the sensor signals to determine desired tire condition data and/or diagnostic information. Each ASIC 38, 40, 42 provides tire condition data and/or diagnostic information to its corresponding transmitter 44, 46, 48. Each transmitter 44, 46, 48, under the control of its respective ASIC 38, 40, 42, provides an encoded data message signal to an associated antenna 50, 52 and 54 indicative of the data received from the ASIC. The antenna 50, 52, 54 transmits or broadcasts the data message as an RF signal through free space, indicated respectively at 51, 53, 55. The data message may include an indication of tire condition, diagnostic information for the associated module, an identification (ID) code of the module, a tire ID code indicating the location of the module relative to the vehicle, etc.

The RF signals 51, 53, and 55 from the modules 14, 16, and 18 are received at an antenna 60 of the receiver module 62. The received signals are decoded by appropriate circuitry of the module 62 and provided to a controller 64. The controller 64 may include the circuitry that decodes or demodulates the signals. Alternatively, the decoder circuitry may be external to the controller 64 and connected between the antenna 60 and the controller.

Preferably, the controller 64 is a microcontroller or microcomputer configured for receiving the tire condition data signals, decoding and processing the received signals, and providing an indication of the received tire condition information. For example, the controller 64 is electrically connected to a speaker 66 for, when appropriate, providing an audible indication, e.g., a warning signal, based on the information contained in the data messages. Alternatively or in addition to the speaker 66, the controller 64 is connected to a display 68 that provides a visual indication of the received tire condition and diagnostic information. The display 68, for example, may be an LED or LCD display of known configuration for displaying detailed tire condition information for each vehicle tire as sensed by the tire condition sensor modules 14, 16, and 18.

The controller 64, the associated display 68, and speaker 66 are powered by a power supply 70. The power supply may be a vehicle battery, such as when the receiver module 62 is mounted within the vehicle 10. The receiver module 62 alternatively might be powered by an internal power supply. It is also contemplated that the receiver module 62 may be a hand-held, portable device or fob that a vehicle occupant or other individual may carry to obtain an audible and/or visual indication of the tire condition and/or diagnostic information.

While, in accordance with one embodiment of the present invention, the communications link between the modules 14, 16, and 18 and the receiver 62 has been described as being an RF link, other wireless communication links could be used in accordance with the present invention.

Figure 2:
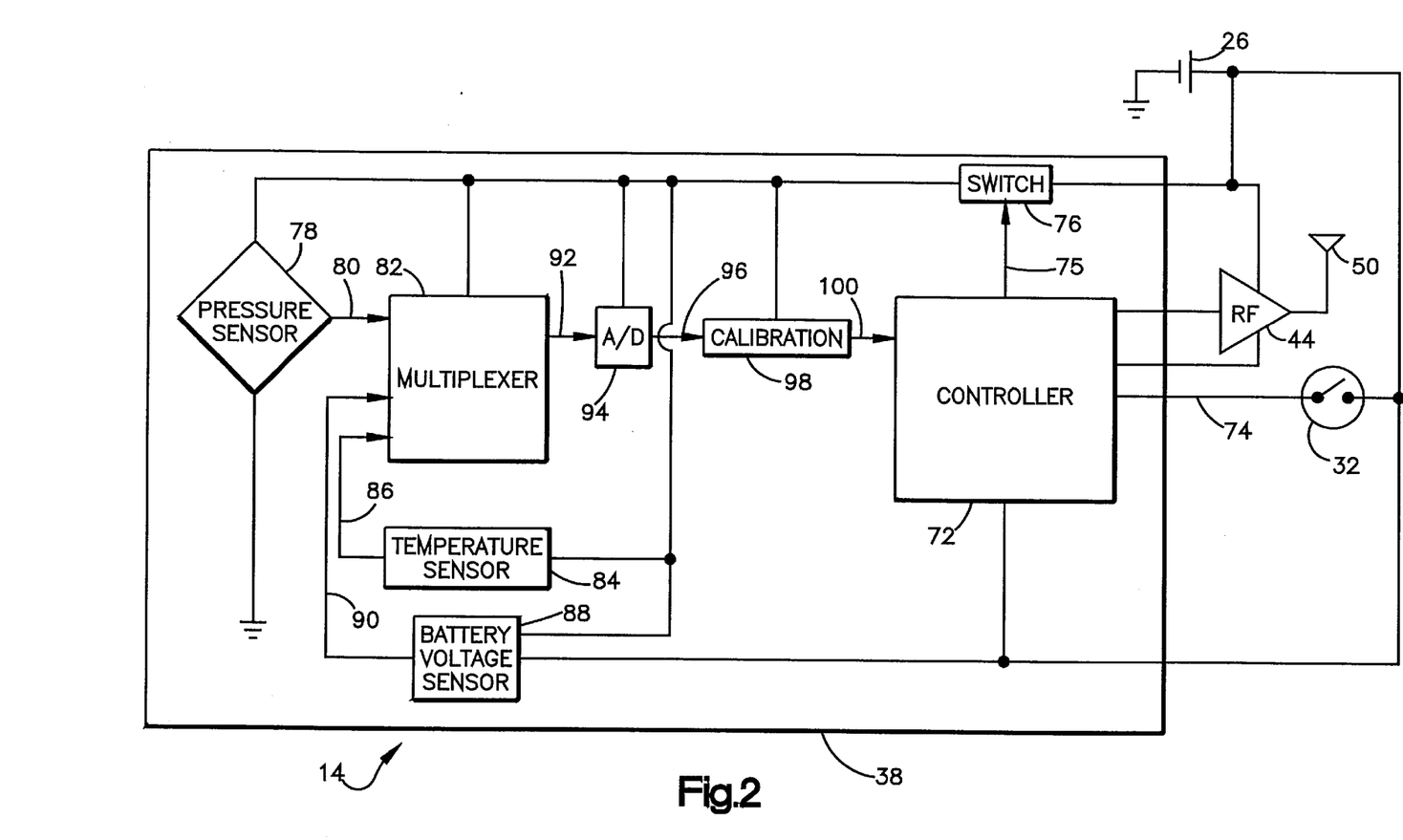
FIG. 2 is a block diagram of a sensor module of the system of FIG. 1 in accordance with the present invention.

FIG. 2 illustrates the tire condition sensor module 14 of FIG. 1 in accordance with an exemplary embodiment of the present invention. Identical reference numbers refer to parts of the module 14 previously identified with respect to FIG. 1. The sensor module 14 may be integrated in a single package, operating as a stand alone unit for use with the associated vehicle tire (e.g., 20 of FIG. 1).

The sensor module 14 includes sensor components which are operative to sense various conditions of the vehicle tire and/or to obtain diagnostic information of the module 14. In accordance with an exemplary embodiment of the present invention, the tire conditions include tire pressure and temperature and the diagnostic information includes battery voltage. It is also contemplated that other parameters of the tire and/or of the module also may be monitored in accordance with the present invention. The transmitter 44 of the module 14 broadcasts a data message signal indicative of the sensed parameters, such as in a serial data format, for receipt by the central receiver (e.g., 62 of FIG. 1).

As stated above, the motion detector 32 detects movement of the associated vehicle tire (e.g., 20 of FIG. 1), such as in response to rotation or vibration thereof. Specifically, the motion detector 32 is connected to a controller 72 of the ASIC 38 via connection 74. The motion detector 32 provides a signal to the controller 72 in response to the detected movement.

For example, the motion detector 32 is in the form of a normally open centrifugal switch that closes upon the associated vehicle tire 20 rotating at a predetermined rate. For example, the centrifugal switch closes when the associated tire rotates at a rate corresponding to a vehicle speed of about 10 mph or greater. When the centrifugal switch is closed, it provides a motion signal to the controller 72, such as a logic HIGH signal at a predetermined voltage. The logic HIGH motion signal indicates that the associated vehicle tire (e.g., 20 of FIG. 1) is rotating at a rate corresponding to at least the predetermined vehicle speed. On the other hand, when the centrifugal switch is open, such as for vehicle speeds less than about 10 mph, a logic LOW motion signal of a predetermined voltage, e.g. zero volts, is provided to the controller 72. This indicates either the absence of vehicle movement or movement at a speed less than the predetermined vehicle speed.

The controller 72, for example, may be a microcontroller, a microprocessor, a state machine, discrete components, another ASIC or any combination thereof. The controller 72 controls operation of the module 14. The function of the controller 72 could be implemented as hardware and/or software.

The controller 72 sets an operating mode or state of the module 14 in response to the motion signal received over 74 as well as in response to other criteria. The controller 72 tracks the state of various flag conditions that vary based on monitored parameters, such as pressure, temperature, battery voltage and motion of the associated vehicle tire. The controller 72 controls transitions between operating modes according to the particular value of each of the flag conditions. The controller 72 also controls the timing of tire condition measurements and the timing transmission of data messages.

The controller 72 has an output 75 connected to a control switch 76 for controlling activation of other components of the sensor module 14. In particular, the control switch 76 has an input electrically connected to the power supply 26, such as through an appropriate filter and/or voltage regulator (not shown). The switch 76 also has an output connected to various circuit components located within the ASIC 38. The circuit components could, in accordance with the present invention, be located external to the ASIC 38.

While, for purposes of brevity, a single switch 76 is illustrated as connecting components to the power supply 26, the controller 72 alternatively could control each of the components through separate switches or an appropriate switching matrix. The switches may be located external to the controller 72, such as shown with switch 76 in FIG. 2. Alternatively, one or more switches may be integrated as part of the controller 72 so as to provide desired electrical energy to selected components.

A pressure sensor 78 that is operative to sense tire pressure of the associated vehicle tire (e.g., 20 of FIG. 1) is connected to the switch 76. The pressure sensor 78 provides a tire pressure signal 80 to an input of a multiplexer circuit 82 indicative of the sensed tire pressure. In particular, the pressure sensor 78 provides the tire pressure signal 80 when activated by the control switch 76. The pressure sensor 78, for example, may be an analog pressure sensing device, such as a Wheatstone bridge, that provides a signal having an electrical characteristic (e.g., a voltage differential) indicating an absolute relative pressure detected by the sensor 78. The pressure sensor 78 is capable of sensing pressure within a range, for example, from about 50 kPa to about 640 kPa over a wide temperature range.

A temperature sensor 84 also is connected to the switch 76 and to an input of the multiplexer circuit 82. The temperature sensor 84 provides a signal 86 to the multiplexer circuit 82 having an electrical characteristic indicative of the sensed temperature of the associated vehicle tire. The controller 72 controls operation of the temperature sensor 84 through activation of the control switch 76.

A battery voltage sensor 88 is electrically connected between the internal power supply 26 and an input of the multiplexer circuit 82. The voltage sensor 88 samples the voltage of the power supply 26 upon activation of the control switch 76 by the controller 72. The voltage sensor 88 provides a battery voltage signal 90 to the multiplexer circuit 82 having an electrical characteristic indicative of the sensed voltage. The value of the battery voltage signal 90 after each broadcast provides a good indication of the electrical energy available in the power supply 26.

The multiplexer circuit 82 thus receives parallel input signals 80, 86 and 90 from the respective sensing components 78, 84 and 88. The multiplexer circuit 82, in turn, provides a multiplexed serial output signal 92, indicative of the sensed parameters from each of the sensors 78, 84 and 88. The controller 72 also could be connected to the multiplexer circuit 82 to further control the multiplexing function thereof. The multiplexed data signal 92 is provided to an analog-to-digital converter (A/D) 94 which provides a digitized output signal 96 to a calibration function 98. Alternatively, the signals from the sensors 78, 84, and 88 could be digitized prior to being provided to the multiplexer circuit 82.

The calibration function 98, which may be hardware and/or software, is configured to de-multiplex the digitized data signal 96 received from ADC 94 and calibrate the data into a readable format for the controller 72. For example, the calibration function 98 may include a plurality of pressure curves, temperature curves and/or look-up tables from which calibrated temperature and pressure values are determined based on the information contained in the digitized data signal 96. The look-up table and curves are derived from empirical data over a wide range of temperature and pressure for the particular pressure and temperature sensors 78 and 84 being used. The calibration function 98 also includes a look-up table for converting the digitized voltage signal into a calibrated voltage value in a useable format.

The calibration block 98 provides a calibrated output signal 100 to another input of the controller 72. The signal 100 has a characteristic or value indicative of each of the sensed parameters, e.g., pressure, temperature, and battery voltage. The controller 72 receives the calibrated data signal 100 and stores at least some of the received data in appropriate memory (not shown).

The controller 72 also is programmed with a unique identification (ID) code for the transmitter 44 of the module 14 and, optionally, a tire ID code. The transmitter ID code is set at the manufacturer. The tire ID code may be set at the factory or by a technician who installs the module. The tire ID code is set to indicate the tire location of the module 14 relative to the vehicle.

The controller 72 is electrically connected with the transmitter 44 for controlling transmissions of the data message through the associated antenna 50. The broadcast of the data message signal occurs at selected times based on the particular operating mode of the ASIC 38. The controller 72 determines the operating mode of the ASIC 38 in response to both the motion signal received over connection 74 and in response to the sensed parameters indicated by the calibrated output signal 100.

The controller 72 has a first operating mode, hereinafter referred to as the normal operating mode, in response to the motion signal indicating at least a predetermined rate of rotation of the associated vehicle tire, i.e., the centrifugal switch is closed. In the normal operating mode, for example, the controller 72 controls the switch 76 to effect periodic activation of the tire condition sensors 78, 84 and 88 as well as the other circuit components 82, 94 and 98 of the ASIC 38. Accordingly, sensors 78, 84 and 88 periodically sense the tire condition of the associated vehicle tire at a predetermined rate, such as about once every four to ten seconds. Also, in the normal operating mode, the controller 72 controls the RF transmitter 44 to broadcast the data message signal. The broadcast of each data message signal occurs intermittently at random time intervals within a variable time window, such as ranging from about three to about five minutes. This helps to reduce the overlap and interference of data messages from other sensor modules (e.g., 16, 18 of FIG. 1).

When the centrifugal switch 32 is opened, thereby indicating rotation of the vehicle tire at a rate corresponding to less than a predetermined vehicle speed, the controller 72 controls the sensor module 14 to operate in a second, different operating mode. The second operating mode is referred to as a sleep mode.

In the sleep mode, the controller 72 controls the switch 76 to activate each of the tire condition sensors 78, 84, and 88 so as to sense their respective parameters at a periodic rate that is substantially slower than the rate at which corresponding tire conditions are sensed when in the normal operating mode. In the sleep mode, for example, the sensors 78, 84, and 88 are controlled to sense the tire conditions about every 15 minutes.

However, rather than intermittently broadcasting at random time intervals, as in the normal operating mode, the tire condition data signal is broadcast in the sleep mode only after one or more of the sensed tire conditions is determined to be below a predetermined threshold. For example, when in the sleep mode, the controller 72 controls the transmitter 44 to broadcast the tire condition data signal only after first determining that the sensed tire pressure is below a predetermined threshold, such as about 220 kPa or about 18 psi. The broadcasting alternatively could be based on determining that the sensed temperature is at or above some predetermined level or that the sensed battery voltage is below a voltage threshold.

The sleep mode helps to conserve the energy of the internal power supply 26 when the vehicle is parked or otherwise not being used. The sleep mode advantageously still provides for relatively frequent measurements of the tire condition so that upon determining the occurrence of, for example, a low tire pressure condition, this information is provided to the driver upon starting the vehicle as key-on-status information. The restricted broadcasts in the sleep mode further help to reduce interference with other RF communication links of the vehicle, such as a remote keyless entry system, that typically occur when the vehicle is stationary. Other operating modes also may be used to control the frequency of parameter measurements as well as transmission of the data message signals.

Figure 3:
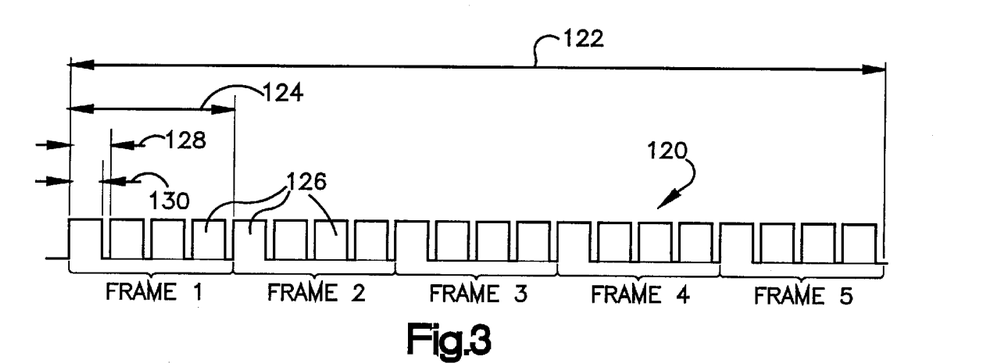
FIG. 3 is a representation of a data message transmitted from the sensor module of FIG. 2.

Referring to FIG. 3, a data message 120 has a time interval, indicated at 122. The data message 120 is subdivided into a plurality of data frames, such as five, indicated as FRAME 1 through FRAME 5. The time interval of FRAME 1 is indicated at 124. Each frame preferably has the same time interval. Each data frame is further divided into a plurality of time slots 126 into which desired data may be provided. In this example, there are four time slots per frame, although other numbers of time slots per frame could be used. The grouping of data that is provided in a time slot 126 is hereinafter referred to as a data packet. The duration of a time slot is indicated at 128 and the duration of a data packet is indicated at 130.

Figure 4:
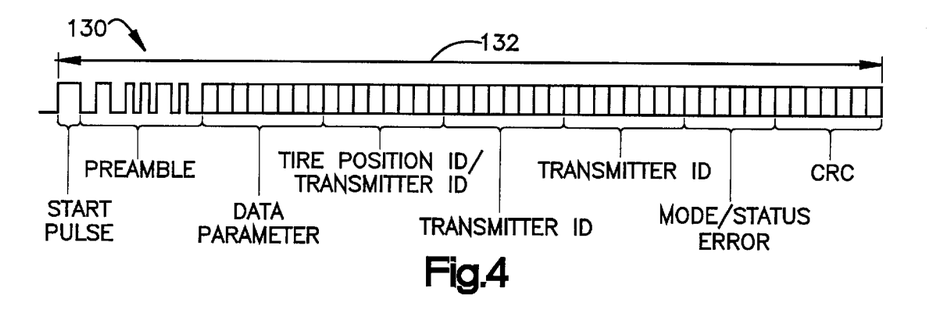
FIG. 4 is a more detailed representation of part of the data message of FIG. 3.

By way of example, FIG. 4 illustrates a functional example of a data packet 130 that extends an interval indicated at 132. Each data packet 126 in a data message includes a plurality of data bits that contains selected data. In this example, starting from the left side of FIG. 4, the data packet 130 includes a start pulse followed by a preamble that contains synchronization information for the data packet. Next, the data packet contains calibrated data indicative of one or more of the sensed parameters, including at least one of temperature, battery voltage, and pressure. The data packet 126 also contains data indicating the type of calibrated data being indicated in the data packet.

Next, the data packet 130 contains data corresponding to the tire ID code and the transmitter ID code. For example, the tire position ID code may comprise three bits while the transmitter ID code may comprise 19 bits. Following the ID code information, the data packet 130 includes data bits indicating the current operating mode of the transmitter. In addition, data bits are provided to indicate temperature status, such as whether the sensed temperature is normal, invalid, a low temperature, or a high temperature. Error bits also may be provided for indicating a low battery condition or other internal errors detected by the controller at the sensor module. A cyclic redundancy check (CRC) of the proceeding data also is provided in the data packet 130 for error detection.

In accordance with an exemplary embodiment of the present invention, each data frame contains two data packets located in selected data slots. A data packet is positioned in the first slot of each frame. The second data packet in each frame of the data message is located in a time slot randomly selected from the three remaining slots per frame per data message. The random location for the second data packet in a frame is determined based on a selected parameter of the module 14. The parameter, for example, could be the transmitter ID code or a sensed tire condition, such as pressure, temperature, wheel speed, etc.

In accordance with an exemplary embodiment of the present invention, the time slot selection for the second data packet is determined by a random number generator, which may be hardware and/or software. The random number generator selects a time slot in each frame of the data message based on a parameter associated with module 14. As mentioned above, the parameter could include the transmitter ID code, the tire position ID code and/or a sensed tire condition (e.g., pressure, temperature, wheel speed, etc.). In particular, the parameter is used to initialize or seed the random number generator. The random number generator, in turn, modifies or shifts its values for each frame so as to provide a random value associated with a data slot locations for each frame of the data message.

Figure 5:
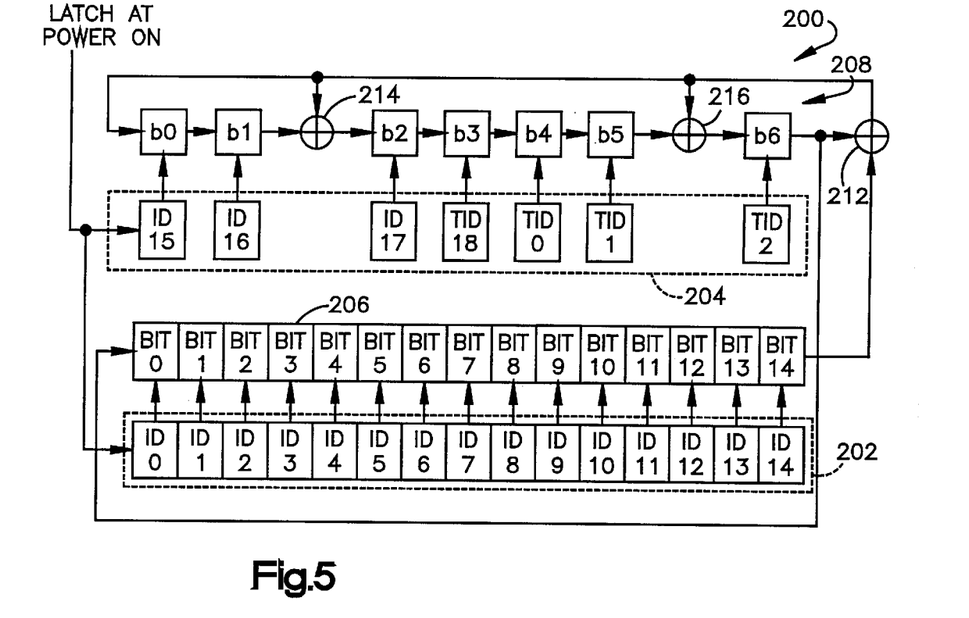
FIG. 5 is an example of a random number generator for use in the sensor module of FIG. 2.

An example of a random number generating algorithm 200 is illustrated in FIG. 5. The algorithm 200 is a cyclic block coding scheme seeded by the transmitter ID code and the tire position ID code. In this example, the transmitter ID code is formed of 19 bits (ID0–ID18) and the tire position ID code has three bits (TID0–TID2). The random numbers are generated through the rotation of data through linear feedback shift registers and by Boolean operations performed on the data being shifted. The algorithm 200 may be implemented as hardware and/or software. While the example illustrated in FIG. 5 is a bitwise algorithm, larger units of bits could be used and may be combined with other arithmetic operations to help generate random numbers.

Referring to FIG. 5, the algorithm 200 includes a register 202 into which some of the transmitter ID bits (ID0–ID14) are stored. The algorithm 200 also includes another register 204 into which the remaining transmitter ID bits (ID15–ID18) are stored together with the tire position ID bits (TID0–TID2). At power on, the transmitter ID bits (ID0–ID14) are latched from the register 202 into a shift register 206. This typically occurs at the manufacturing plant when the battery (e.g., 26 of FIG. 2) is connected to the module. Also at power on, the other transmitter ID bits (ID15–ID18) along with the tire position ID bits (TID0–TID2) are latched from the register 204 into registers b0–b6 of a feedback shift register 208. Specifically, ID15 is latched into b0, ID16 is latched into b1, ID17 is latched into b2, ID18 is latched into b3, TID0 is latched into b4, TID1 is latched into b5, and TID2 is latched into b6. In the situation when no tire position ID code is programmed, a predetermined bit value of 0 or 1 is stored in memory (e.g., TID0–TID2) of the controller, which values are latched into registers b4–b6 at power on.

Each time the shift register 208 is clocked, the values of each register b0–b6 is shifted in the direction of the corresponding arrows. In addition, the values of BIT0–BIT13 are shifted one space to the right for each clock pulse provided to register 206. Preferably, the registers 206 and 208 are clocked simultaneously. An Exclusive OR function 212 Exclusive ORs the value of BIT14 of register 206 with the value of register b6 each time the algorithm 200 is shifted. The value b6 also is fed as feedback into BIT0 of the shift register 206 each time the register 200 is shifted.

The output value of the Exclusive OR function 212 is provided as feedback to two other Exclusive OR functions 214 and 216, as well as being loaded into the shift register b0 at each clock pulse. The value of shift register b1 is Exclusive ORed together with the output value of the Exclusive OR function 212 which is, in turn, shifted into b2. Similarly, Exclusive OR function 216 performs an Exclusive OR operation on the output value of Exclusive OR function 212 and the value of register b5. The output value of the Exclusive OR function 216 is provided to register b6 at the next clock pulse.

In accordance with an exemplary embodiment of the present invention, the values of shift registers b5 and b6 provide a two bit random number used to select the second slot of a given frame. Data is shifted in the algorithm 200 at least once for each data frame so that a different random value may be provided for slot selection in each frame.

By way of example, Table 1 illustrates the correlation of the random binary values of registers b5 and b6 to the slot selection for the current frame for the situation where there are four slots per frame. Other numbers of slots per frame could be used in accordance with the present invention. Similarly, the values of registers b0–b4 provides another random number (e.g., a decimal value of 0–31) that is used in the time measurement interval between transmissions of subsequent data messages.

TABLE 1

| Random Value | Selected Slot |
| --- | --- |
| 00 | Slot 2 |
| 01 | Slot 3 |
| 10 | Slot 3 |
| 11 | Slot 4 |

Each tire transmitter module of the system (e.g., 12 of FIG. 1) includes such a random number generating algorithm 200. Each algorithm is initialized with a unique number, namely, the transmitter ID code and (when used) the tire position ID code. The ID code values are shifted into the feedback shift register over a period of shifts and then the results are continually rotated through the feedback shift register. In this way, the values of the different registers b0–b6 are manipulated to continually generate random numbers at registers b0–b6.

The content of the data packet also may vary as a function of the operating mode of the module. For example, in a normal mode and a pressure alert mode, slot one in each frame contains pressure data. The second packet in frame 3 contains temperature data, the second packet in frame 4 contains battery voltage data, and a second packet in frame 5 contains other parameters, such as data indicating the value of a run flat counter. In a temperature alert mode, slot one in each frame contains pressure data while the second packet in each frame contains temperature data.

Figure 6:
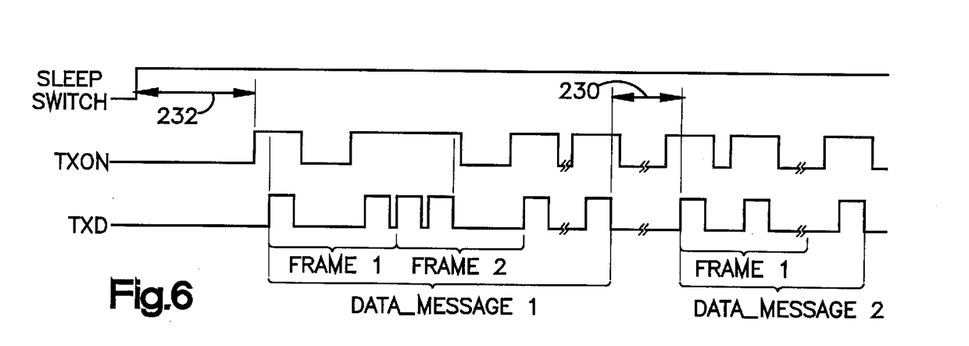
FIG. 6 is a timing diagram for transmission of data messages from the sensor module of FIG. 2.

FIG. 6 illustrates an example of a timing diagram for two data messages (DATA_MESSAGE 1, DATA_MESSAGE 2) formatted according the above-described method. DATA_MESSAGE 1 includes a plurality of data frames, which includes a data packet is located in the first time slot of each frame. A second data packet is located in the last time slot of the first frame, and a second data packet is located in the second time slot of the second frame. This is based on registers 65 and 66 of FIG. 5 having a binary value of 11 when FRAME 1 is packaged and a binary value of 00 when FRAME 2 is packaged. For purposes of brevity, only one frame of the DATA_MESSAGE 2 is illustrated in which a data packet is located in the first time slot. A second data packet is located in the third time slot in response to the value of registers b5 and b6 providing a binary value of either 01 or 10.

The repetition interval between data message transmissions, indicated at 230, is state dependent. In order to comply with FCC regulations, however, a minimum interval of 15 seconds must be held between data message transmissions. In order to further help avoid collision between transmissions of data messages, the length of the time interval 230 is randomized. The bits b0–b4 of the feedback shift register 208 of FIG. 5 provide a random number that is used to vary the length of the transmission time interval. The time interval further may vary according to the particular operating mode of the module. For example, in the normal mode the time interval 230 may be provided by $(32+n) \times t_m$, where n is a random number in the range of 0 to 31 which is read from registers b4–b0 of the feedback register of the random number generator and $t_m$ is the measurement interval over which the sensor measurements were taken, such as a nominal interval of 7.2 seconds.

In accordance with another aspect of the present invention, the timing of the first data transmission after activation of the motion detector also is based on at least some of the transmitter ID code and tire position ID code values. By way of example, the first transmission of a data message is delayed by a binary value of (TID2–TID0, ID18–ID14)×22 milliseconds. This initial delay is indicated at 232 in FIG. 6.

In view of the foregoing, the present invention provides an apparatus and method for helping avoid collision of data messages in a tire pressure sensing system. The controller of the transmitter varies the locations of selected data packets as a function of a random number generated using a parameter associated with the transmitter module, such as the transmitter ID code and, optionally, the tire position ID code. The controller of the transmitter module also may vary the interval between adjacent data messages based on the transmitter ID code and/or the tire position ID code.

In view of the foregoing, the present invention provides a system and method in which desired the tire condition data is transmitted in selected data slots in each frame of each data message.

From the above description of the invention, those skilled in the art will perceive improvements, changes and modifications. Such improvements, changes and modifications within the skill of the art are intended to be covered by the appended claims.

Having described the invention, the following is claimed:

1. A tire condition sensing apparatus comprising:
   a tire condition sensor for sensing a tire condition;
   a transmitter for transmitting a data message having a plurality of data locations for accommodating data; and
   a controller electrically connected with said tire condition sensor and said transmitter, said controller controlling said transmitter to transmit tire condition data in selected data locations of said data message based on an identification code of said apparatus.

2. An apparatus as set forth in claim 1 wherein said selected data locations of said data message are randomly determined based on the identification code of said apparatus.

3. An apparatus as set forth in claim 2 wherein said data message is a serial data message which includes a plurality of frames, each of said frames having a plurality of data locations, said controller controlling said transmitter to provide tire condition data in a randomly selected data location of each frame of said data message, the location of said randomly selected data location being determined based on the identification code of said apparatus.

4. An apparatus as set forth in claim 3 wherein said controller further includes means for determining a randomly selected data location for each frame of each data message transmitted by said transmitter.

5. An apparatus as set forth in claim 4 wherein said determining means is a random number generator initialized by the identification code of said apparatus, said random number generator providing a signal having value indicative of the randomly selected data location for each frame of each data message transmitted by said transmitter.

6. An apparatus as set forth in claim 3 wherein said controller controls said transmitter to provide first desired data in a first data location of each frame of said data message and provide other desired tire condition data in a randomly selected second data location of each frame of said data message.

7. An apparatus as set forth in claim 6 wherein said controller has a plurality of operating modes and the content of the other desired tire condition data for each frame of said data message varies based on the operating mode of said controller.

8. An apparatus as set forth in claim 2 wherein the selected data locations further vary based on the location of said transmitter relative to a vehicle in which said apparatus is mounted.

9. An apparatus as set forth in claim 1 further including a motion detector electrically connected to said controller, said motion detector providing a motion signal to said controller indicative of vehicle motion, said controller activating said tire condition apparatus in response to the motion signal.

10. An apparatus as set forth in claim 9 wherein said controller, when activated in response to the motion signal, controls said transmitter to delay transmission of tire condition information a duration responsive to the identification code of said apparatus.

11. An apparatus as set forth in claim 10 wherein the duration of transmission delay is randomly determined based on the identification code of said apparatus.

12. A tire condition sensing system for a vehicle comprising:
a plurality of tire pressure transmitter modules, each of said plurality of modules having a unique identification code and including:
a tire condition sensor for sensing a condition of the associated tire;
a transmitter for, when activated, transmitting a data message having a plurality of data locations for accommodating tire condition data for the associated vehicle tire; and
a controller electrically connected with said tire condition sensor and said transmitter, said controller controlling said transmitter to transmit tire condition data in randomly selected data locations of said data message, the randomly selected data locations being determined based on the unique identification code of said module.

13. A system as set forth in claim 12 wherein the data message from each of said transmitters is a serial data message that includes a plurality of frames, each of said frames having a plurality of data locations, each of said controllers controlling the associated one of said transmitters to provide tire condition data in a randomly selected data location of each frame of the data message, said randomly selected data location of each frame being determined based on the identification code of the associated one of said modules.

14. A system as set forth in claim 13 wherein each of said controllers has a plurality of operating modes and controls the associated one of said transmitters to provide first desired tire condition data in a first data location of each frame of said data message and provide other desired tire condition data in a randomly selected second data location of each frame of said data message, the content of the other desired tire condition data for each frame of said data message varying based on the operating mode of the associated one of said controllers.

15. An apparatus as set forth in claim 13 wherein the randomly selected data locations further vary based on a programmed location of the associated one of said transmitters relative to a vehicle in which said apparatus is mounted.

16. An apparatus as set forth in claim 13 wherein each of said controllers further includes means for determining a randomly selected data location tire condition data in each data message transmitted by the associated one of said transmitters.

17. An apparatus as set forth in claim 16 wherein said determining means is a random number generator initialized with the identification code of the associated one of said modules, said random number generator providing a signal having value indicative of the randomly selected data location for tire condition data in each data message transmitted by the associated one of said transmitters.

18. A tire condition sensing apparatus comprising:
a tire condition sensor for sensing a tire condition;
a transmitter for transmitting a data message having a plurality of data locations for accommodating data; and
a controller electrically connected with said tire condition sensor and said transmitter, said controller controlling said transmitter to transmit tire condition data in selected data locations of said data message based on a parameter associated with said apparatus.

19. An apparatus as set forth in claim 18 wherein said apparatus has a unique identification code, said parameter associated with said apparatus being functionally related to said identification code of said apparatus.

20. An apparatus as set forth in claim 18 wherein said parameter associated with said apparatus is functionally related to the sensed tire condition.

21. An apparatus as set forth in claim 18 wherein said controller further includes means for determining randomly selected data locations in said data message based on the parameter associated with said apparatus, said controller controlling said transmitter to transmit tire condition data in the determined randomly selected data locations in each data message transmitted by said transmitter.

22. An apparatus as set forth in claim 21 wherein said determining means is a random number generator initialized by the parameter of said apparatus, said random number generator providing a signal having value indicative of said randomly selected data location in each data message transmitted by said transmitter.

23. A method of transmitting a data message from a tire condition module, comprising the steps of:
sensing a condition of a tire;
determining random data locations of a data message based on an identification code of the tire condition module; and
transmitting a data message in which tire condition data indicative of the sensed tire condition is provided in the determined random data locations of the data message.

24. A method as set forth in claim 23 wherein the data message is a serial data message which includes a plurality of frames, each of said frames having a plurality of data locations, said method further including providing tire condition data in a random data location of each frame of the data message, the random data location being determined based on the identification code of the tire condition module.

25. A method as set forth in claim 24 wherein said step of determining further includes initializing a random number generator based on the identification code of the tire condition module, said random number generator providing a signal having value indicative of each random data location in each transmitted data message.

26. A method as set forth in claim 24 wherein first desired tire condition data is provided in a first data location of each frame of the data message and second desired tire condition data is provided in a randomly determined second data location of each frame of the data message.

27. A method as set forth in claim 26 wherein said step of transmitting repeats at a rate according to a selected one of a plurality of operating modes, the content of the second desired tire condition data for each frame of said data message being determined based on the operating mode of said controller.

28. A method as set forth in claim 27 further including the steps of detecting movement of the vehicle, determining the selected one of the operating mode based on the detected movement of the vehicle, and activating the transmitter in response to the detected movement of the vehicle.

29. A method as set forth in claim 28 further including the step of delaying said step of transmitting the data message a duration based on the identification code of the tire condition module upon the transmitter being activated.

30. An method as set forth in claim 29 wherein the duration of transmission delay is determined randomly based on the identification code of the tire condition module.

* * * * *